US009634954B2

(12) United States Patent
Kaiser et al.

(10) Patent No.: US 9,634,954 B2
(45) Date of Patent: Apr. 25, 2017

(54) SWITCHABLE BUSINESS FEATURE WITH PRICES AND SALES INTEGRATION

(71) Applicants: Martin Kaiser, Limburgerhof (DE); Renzo Colle, Stutensee (DE); Martin J. Wilmes, Oftersheim (DE); Frank Wagner, Dielheim (DE); Michael Conrad, Oftersheim (DE)

(72) Inventors: Martin Kaiser, Limburgerhof (DE); Renzo Colle, Stutensee (DE); Martin J. Wilmes, Oftersheim (DE); Frank Wagner, Dielheim (DE); Michael Conrad, Oftersheim (DE)

(73) Assignee: SAP SE, Walldorf (DE)

( * ) Notice: Subject to any disclaimer, the term of this patent is extended or adjusted under 35 U.S.C. 154(b) by 285 days.

(21) Appl. No.: 13/927,452

(22) Filed: Jun. 26, 2013

(65) Prior Publication Data

US 2015/0006675 A1 Jan. 1, 2015

(51) Int. Cl.
| | |
|---|---|
| *G06F 15/16* | (2006.01) |
| *H04L 12/911* | (2013.01) |
| *G06F 21/62* | (2013.01) |
| *G06F 9/54* | (2006.01) |
| *H04L 29/08* | (2006.01) |

(52) U.S. Cl.
CPC .............. *H04L 47/70* (2013.01); *G06F 9/547* (2013.01); *G06F 21/629* (2013.01); *H04L 67/16* (2013.01)

(58) Field of Classification Search
CPC ......... H04L 47/70; H04L 67/16; G06F 9/547; G06F 21/629

USPC ......................................................... 709/219
See application file for complete search history.

(56) References Cited

U.S. PATENT DOCUMENTS

| | | |
|---|---|---|
| 7,461,091 B2 | 12/2008 | Schneider et al. |
| 7,707,432 B2 | 4/2010 | Colle et al. |
| 7,730,056 B2 | 6/2010 | Kaiser et al. |
| 8,117,408 B2 | 2/2012 | Saterdag et al. |

(Continued)

OTHER PUBLICATIONS

U.S. Appl. No. 11/864,866, filed Sep. 28, 2007, Igor Becker et al.

(Continued)

*Primary Examiner* — Arvin Eskandarnia
*Assistant Examiner* — Javier O Guzman
(74) *Attorney, Agent, or Firm* — Fish & Richardson P.C.

(57) ABSTRACT

The present disclosure describes methods, systems, and computer program products for providing a remote device remote access to software functions. One method includes providing a list of second software functions to a first remote device that are not accessible by the remote device, wherein the remote device has remote access to a first software function; receiving from the remote device a request for a software function of the provided list of second software functions and upon receiving the request, providing the remote device remote access to the requested software function by transmitting access data for the requested software function to the remote device; and after providing the remote access to the requested software function, receiving from the remote device a deactivation command for the requested software function or the first software function and, based on the deactivation command, deactivating the remote access of the remote device to the requested software function or the first software function.

21 Claims, 10 Drawing Sheets

(56) References Cited

U.S. PATENT DOCUMENTS

| | | | |
|---|---|---|---|
| 8,212,683 B2 | 7/2012 | Klein et al. | |
| 8,219,650 B2 | 7/2012 | Krasinskiy et al. | |
| 8,311,794 B2 | 11/2012 | Saterdag et al. | |
| 8,311,904 B2 | 11/2012 | Steinbach et al. | |
| 8,312,416 B2 | 11/2012 | Freund et al. | |
| 8,321,250 B2 | 11/2012 | Pachter et al. | |
| 8,321,831 B2 | 11/2012 | Faisst et al. | |
| 8,321,844 B2 | 11/2012 | Zoch et al. | |
| 8,326,706 B2 | 12/2012 | Clemens et al. | |
| 8,359,218 B2 | 1/2013 | Poth et al. | |
| 8,396,827 B2 | 3/2013 | Gross et al. | |
| 8,402,426 B2 | 3/2013 | Alfandary et al. | |
| 8,412,549 B2 | 4/2013 | Graeber et al. | |
| 8,417,588 B2 | 4/2013 | Ringl et al. | |
| 8,417,731 B2 | 4/2013 | Dehn et al. | |
| 8,442,850 B2 | 5/2013 | Schorr et al. | |
| 2002/0026478 A1* | 2/2002 | Rodgers et al. | 709/205 |
| 2003/0236867 A1* | 12/2003 | Natsuno et al. | 709/220 |
| 2004/0117046 A1 | 6/2004 | Colle et al. | |
| 2004/0133889 A1 | 7/2004 | Colle et al. | |
| 2004/0158568 A1 | 8/2004 | Colle et al. | |
| 2005/0010606 A1 | 1/2005 | Kaiser et al. | |
| 2005/0022156 A1 | 1/2005 | Schwan et al. | |
| 2005/0048997 A1* | 3/2005 | Grobler et al. | 455/550.1 |
| 2005/0132347 A1* | 6/2005 | Harper et al. | 717/168 |
| 2006/0037031 A1 | 2/2006 | Colle et al. | |
| 2006/0080338 A1 | 4/2006 | Seubert et al. | |
| 2006/0085450 A1 | 4/2006 | Seubert et al. | |
| 2006/0229888 A1 | 10/2006 | Colle et al. | |
| 2007/0150387 A1 | 6/2007 | Seubert et al. | |
| 2007/0152044 A1 | 7/2007 | Hirth et al. | |
| 2007/0156473 A1 | 7/2007 | Colle et al. | |
| 2007/0174145 A1 | 7/2007 | Hetzer et al. | |
| 2008/0120129 A1 | 5/2008 | Seubert et al. | |
| 2008/0162457 A1 | 7/2008 | Dehn et al. | |
| 2008/0162563 A1 | 7/2008 | Gross et al. | |
| 2008/0162587 A1* | 7/2008 | Auer | G06F 8/60 |
| 2008/0162616 A1 | 7/2008 | Gross et al. | |
| 2008/0162777 A1 | 7/2008 | Kaiser et al. | |
| 2008/0216072 A1 | 9/2008 | Schneider et al. | |
| 2008/0275713 A9 | 11/2008 | Alfandary et al. | |
| 2008/0307433 A1 | 12/2008 | Zoch et al. | |
| 2009/0171712 A1 | 7/2009 | Heinrichs et al. | |
| 2009/0171758 A1 | 7/2009 | Alfandary et al. | |
| 2010/0070330 A1 | 3/2010 | Marschall et al. | |
| 2010/0070331 A1 | 3/2010 | Koegler et al. | |
| 2010/0153150 A1 | 6/2010 | Prigge et al. | |
| 2011/0047214 A1* | 2/2011 | Lee et al. | 709/204 |
| 2012/0086563 A1* | 4/2012 | Arling et al. | 340/12.52 |
| 2012/0124553 A1* | 5/2012 | Eschenroeder | G06F 8/71 717/121 |
| 2013/0219009 A1* | 8/2013 | Bheemarajaiah et al. | 709/217 |
| 2014/0115030 A1* | 4/2014 | Bayliss | H04L 67/16 709/203 |

OTHER PUBLICATIONS

U.S. Appl. No. 13/782,093, filed Mar. 1, 2013, Astrid R. Graeber et al.
U.S. Appl. No. 13/832,979, filed Mar. 15, 2013, Rene Dehn et al.
U.S. Appl. No. 13/908,512, filed Jun. 3, 2013, Renzo Colle.

* cited by examiner

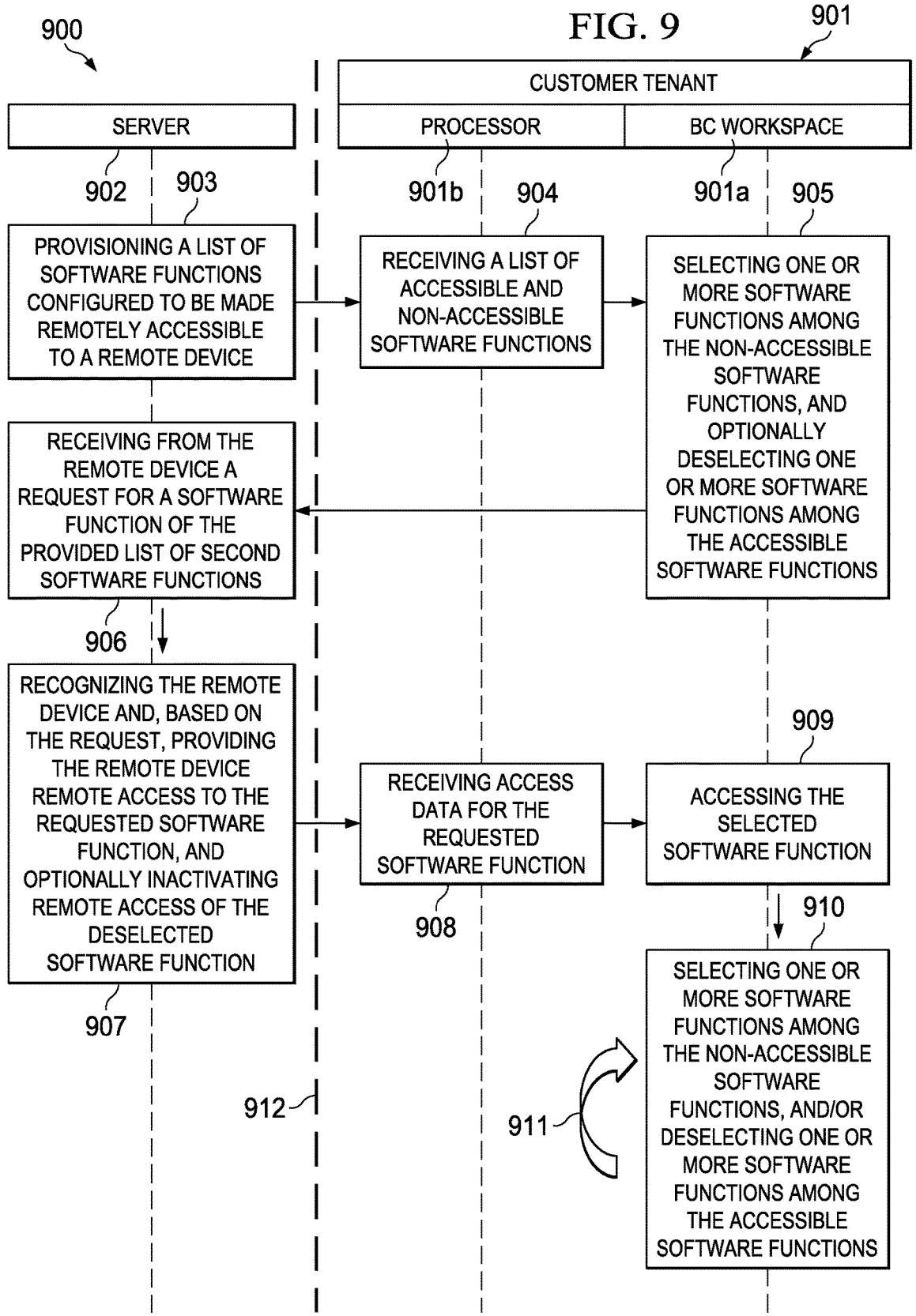

SWITCHABLE BUSINESS FEATURE WITH PRICES AND SALES INTEGRATION

TECHNICAL FIELD

The present disclosure relates to software, computer systems, and computer-implemented methods for providing a remote device remote access to multiple software functions that can dynamically be switched on or off.

BACKGROUND

Software products (e.g., networked application (NWAs) can be built upon a platform, where the platform is used as a basis upon which multiple applications are developed "on top" of, or based upon, the platform. As one example, proprietary on-demand business process platforms can be used to create many on-demand products, as well as, networked applications built using at least a portion of the platform. On-demand products can be a fully integrated enterprise resource planning (ERP), or business management software solutions. The on-demand products can be a software-as-a-service (SaaS) system in which software and its associated data are hosted centrally (for example, in a cloud-computing environment), and are accessed by users using a client (e.g., a web browser) over the internet. For data exchange between different software products, data may need to be copied, transferred, or manipulated in other means to be used.

SUMMARY

The present disclosure describes methods, systems, and computer program products for providing a remote device remote access to multiple software functions that can dynamically be switched on or off.

In a general aspect 1, A computer-implemented method for providing a remote device remote access to software functions, the method comprising the following operations performed by one or more servers (e.g., one or more servers of a cloud computing environment): providing a list of second software functions to a first remote device (e.g., a mobile communication device) that are not accessible by the remote device, wherein the remote device has remote access to a first software function; receiving from the remote device a request for a software function of the provided list of second software functions and upon receiving the request, providing the remote device remote access to the requested software function by transmitting access data for the requested software function to the remote device; after providing the remote access to the requested software function, receiving from the remote device a deactivation command for the requested software function or the first software function and, based on the deactivation command, deactivating the remote access of the remote device to the requested software function or the first software function.

Aspect 2 according to aspect 1, wherein deactivating the remote access of the remote device to the requested software function or the first software function comprises: maintaining the remote access to the software function which is not deactivated.

Aspect 3 according to any one of aspects 1 to 2, wherein deactivating the remote access of the remote device to the requested software function or the first software function comprises: deactivating the remote access to the first software function while maintaining the remote access to the requested software function, or deactivating the remote access to the requested software function while maintaining the remote access to the first software function.

Aspect 4 according to any one of aspects 1 to 3, the operations further comprising: after deactivating the remote access of the remote device to the requested software function or the first software function, receiving an activation command for the respective function and, based on the activation command, activating the remote access of the remote device to the respective function.

Aspect 5 according to any one of aspects 1 to 4, wherein the remote access to the requested software function comprises remote access to the first software function augmented by the requested software function.

Aspect 6 according to any one of aspects 1 to 5, the operations further comprising: providing an indication to the first remote device that the list of second software functions comprises one or more software functions that are configured to be combined with the first software function.

Aspect 7 according to any one of aspects 1 to 6, the operations further comprising: accessing data that is locally stored on the remote device, processing the local data and forwarding the processed data from the requested software function to the first software function.

Aspect 8 according to any one of aspects 1 to 7, wherein the first software function and the requested software function are embedded in a (e.g., common) programming code on the one or more computers, wherein the code includes code snippets associated with the first software function and code snippets associated with the requested software function, and wherein the code snippets are configured to activate or deactivate their respective software functions independently from each other.

Aspect 9 according to any one of aspects 1 to 8, the operations further comprising: providing the list of second software functions to a second remote device that are not accessible by the second remote device, wherein the second remote device has remote access to a third software function; receiving from the second remote device a second request for the software function requested by the first remote device and upon receiving the second request, providing the second remote device, independently from the first remote device, remote access to the requested software function by transmitting second access data for the requested software function to the second remote device; after providing the second remote device the remote access to the requested software function, receiving from the second remote device a deactivation command for the requested software function or the third software function and, based on the deactivation command, deactivating, independently from the first remote device, the remote access of the second remote device to the requested software function or the third software function.

While generally described as computer-implemented software embodied on tangible media that processes and transforms the respective data, some or all of the aspects may be computer-implemented methods or further included in respective computer systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 9 illustrates an exemplary method for providing to a remote device remote access to multiple software functions including a dynamic switch on/off of the software functions Reference numbers and designations in the various drawings indicate exemplary aspects, implementations or embodiments of particular features of the present disclosure.

DETAILED DESCRIPTION

Figure 1:
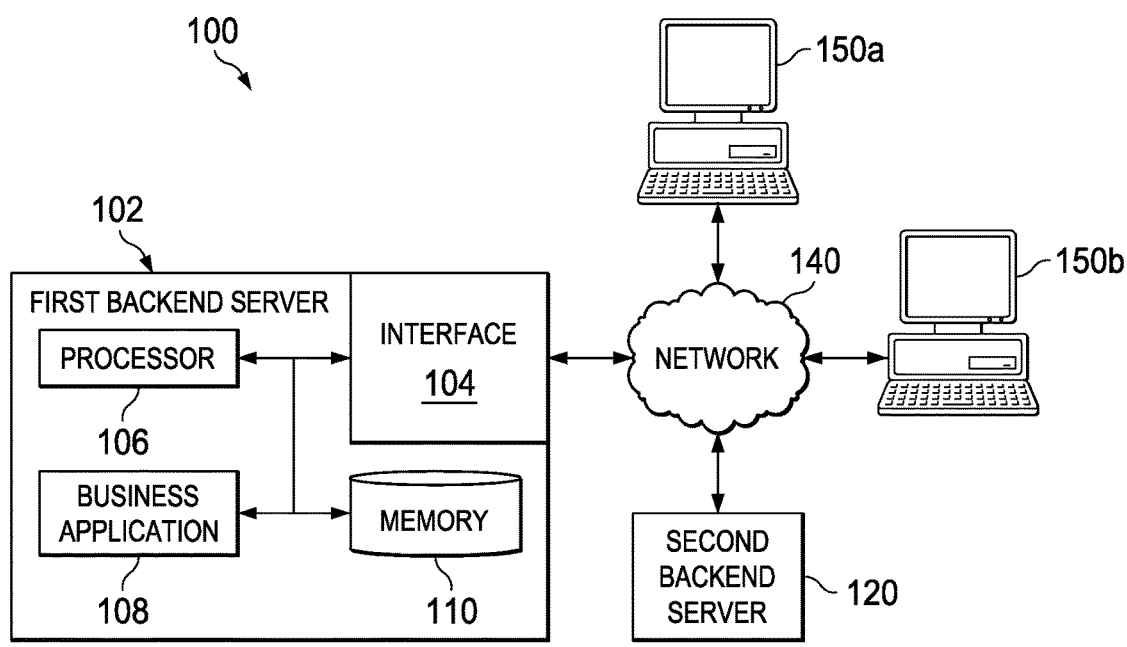
FIG. 1 illustrates an example of a network environment.

This disclosure generally relates to software, computer systems, and computer-implemented methods for providing a remote device remote access to multiple software functions that can dynamically be switched on or off. Specifically, a flexible distribution of remote access of software extensions to remote devices is provided which is especially adapted to cloud-computing network environments. Implementations of the present disclosure described herein may provide one or more of the following advantages:

First, remote access to multiple software functions natively created at one or more servers (e.g., in a cloud computing system) may be provided to remote devices in an easy and rapid manner with near-zero propagation and adoption efforts.

Second, a flexible access to software extensions or additional software is provided independent of platform technology or location of the platform.

Third, a user of a remote device may dynamically switch on and off particular software functions, e.g., depending on a current business requirement.

Fourth, a cloud-computing environment is described that provides a "one-tenant" on-demand remote access to multiple software functionalities.

Fifth, the total cost of ownership in network environments may be reduced.

An on-demand software products can be a software-as-a-service (SaaS) system in which software and its associated data are hosted centrally (for example, in a cloud-computing environment), and are accessed by users using a client (e.g., a web browser) over the internet. The on-demand software product may include functionality for integrated end-to-end business processes across several modules, including Customer Relationship Management (CRM), Financial Management (FM), Project Management (PM), Supply Chain Management (SCM), Supplier Relationship Management (SRM), Human Resources Management (HRM), Executive Management Support (EMS), and Compliance Management (CM). CRM supports processes that span marketing, sales, and service activities. FM can be another module that helps provide companies with a single, up-to-date view of the financial condition by integrating core business processes and financials that span financial, management, accounting, and cash flow management. PM can contain an integrated project management solution. SCM can cover supply chain setup management, supply chain planning and control, and manufacturing, warehousing and logistics. SRM focuses on relationships with supplies, procurement processes aimed at reducing cost, and to perform self-service procurement. HRM spans organizational management, human resources, and employee self-service. EMS can empower management with more control over the business and better decision making, with real time analytics for tracking business aspects. CM helps companies maintain compliance with changing laws and regulations and to meet regulatory standards. Some, all, or other modules or functionalities may exist in particular on-demand products.

The term "tenant" refers to a system providing a set of business applications belonging to or rented by a particular customer or business entity. Several employees of that particular customer or business entity can be users of that tenant and use the business applications provided by or available on this tenant. A "multi-tenant" architecture may provide a single version of the business application, which is centrally hosted in a cloud computing environment and which is provided to multiple tenants. A customer usually may only alter a set of predefined configuration options in the business application within predefined boundaries. This may limit the possibilities to adapt software products such as business or networked applications to the specific needs of the customer, and in particular, usually does not allow to switch functionality on and off in a flexible manner. In contrast to the "one-tenant" architecture described herein, in the conventional "multi-tenant" architecture, multiple tenants may be needed for different bundles of software functions desired by a customer. With the "one tenant" architecture, the customer may augment existing software functions by additional on-demand software functions by using a single tenant, while being provided with dynamic switch on or off functionality for the software functions.

FIG. 1 illustrates an example environment 100 for implementing various features of a system for sharing data across networked applications. The illustrated environment 100 includes, or is communicably coupled with, a front-end client 150*a-b* which represents a customer or a user in a cloud-computing environment and backend server systems 102, 120. In some instances, the front-end client 150*a-b* may co-reside on a single server or system, as appropriate. At least some of the communications between the front-end client 150*a-b* and the backend servers 102, 120 may be performed across or via network 140. In general, environment 100 depicts an example configuration of a system for establishing business networks using networked applications built on a shared platform in a cloud computing environment, such as environment 100. The illustrated system includes development technology and hosted and managed services and applications built on top of the underlying platform technology. In an implementation of the present disclosure described herein, the term "technology" is understood as types of Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC). In an implementation of the present disclosure described herein, the term "technology" comprises SAP ByDesign platform, Success Factors Platform, ERP Suite technology or in-memory database such as High Performance Analytic Appliance (HANA) platform.

The illustrated environment 100 of FIG. 1 includes one or more front-end clients 150a-b. The front-end client 150a-b may be associated with a particular business application or development context, as well as a particular platform-based application system. The front-end client 150a-b may be any computing device operable to connect to or communicate with at least one of the backend servers 102, 120 using a wireline or wireless connection via the network 140, or another suitable communication means or channel. In some instances, the front-end client 150a- may be a part of or associated with a business process involving one or more business applications, or alternatively, a remote developer associated with the platform or a related platform-based application.

In general, the front-end client 150a-b includes a processor, an interface, a networked application or application interface, a graphical user interface (GUI), and a memory. In general, the front-end client 150a-b includes electronic computer devices operable to receive, transmit, process, and store any appropriate data associated with the environment 100 of FIG. 1. As used in this disclosure, the front-end client 150a-b is intended to encompass a personal computer, laptop, tablet PC, workstation, network computer, kiosk, wireless data port, smart phone, personal data assistant (PDA), one or more processors within these or other devices, or any other suitable processing device. The front-end client or tenant 150a-b may be a mobile communication device. For example, the front-end client 150a-b may comprise a computer that includes an input device, such as a keypad, touch screen, mouse, or other device that can accept user information, and an output device that conveys information associated with the operation of one or more business applications, on-demand platforms, and/or the front-end client 150a-b itself, including digital data, visual information, or GUI. Both the input and output device may include fixed or removable storage media such as a magnetic storage media, CD-ROM, or other suitable media, to both receive input from and provide output to users of front-end client 150a-b through the display, namely, the GUI. The networked application or application interface can enable the front-end client 150a-b to access and interact with applications and modules in backend server systems using a common or similar platform. It will be understood that there may be any number of front-end clients 150a-b associated with, or external to, environment 100. For example, while illustrated environment 100 includes one front-end client 150a-b, alternative implementations of environment 100 may include multiple clients communicably coupled to the one or more of the systems illustrated. In some instances, one or more front-end clients 150a-b may be associated with administrators of the environment, and may be capable of accessing and interacting with the settings and operations of one or more business applications, and/or other components of the illustrated environment 100. Additionally, there may also be one or more additional front-end clients 150a-b external to the illustrated portion of environment 100 capable of interacting with the environment 100 via the network 140. Further, the terms "client," "customer," and "user" may be used interchangeably as appropriate without departing from the scope of this disclosure. Moreover, while the front-end client 150a-b is described in terms of being used by a single user, this disclosure contemplates that many users may use one computer, or that one user may use multiple computers. In general, clients may usually belong to one customer or company. Several employees of the customer, called users, can use the applications deployed on the corresponding client. For instance, the term "client" refers to a system providing a set of business applications belonging to or rented by a particular customer or business entity. Several employees of that particular customer or business entity can be users of that client and use the business applications provided by or available on this client.

The backend servers 102, 120 represent dedicated and/or ad hoc systems built using the platform technology for coordinating collaboration with other systems associated with and executing on platform-related technology. The coordinating system is used to manage and operate the system and clients belonging to a cloud computing environment, providing knowledge of and connections to the various systems, clients, and clients therein. The backend servers 102, 120 are enhanced to provide clients 150a-b remote access to software functions managed at the backend servers 102,120. The front-end client 150a-b can access certain business applications built upon a similar, or common, on-demand platform. For example, the front-end client 150a-b may request certain data or data objects in a business application running in the backend server 102; and the request may be executed via the first backend server 102 at the second backend server 120 where the requested data is stored as a master copy. The data stored in the second backend server 120 may be locked and accessed by the first backend server 102, and interacted with the front-end client 150a-b. In other instances, the data may be used by an application associated with one of the other backend servers 120 for processing applications associated with those systems. The environment 100 is an example and, in alternative implementations, the elements illustrated in FIG. 1 may be included in or associated with different and/or additional servers, clients, networks, and locations other than those as shown. For example, one or more of the components illustrated within the backend servers 102, 120 may be located in multiple or different servers, cloud-based or cloud computing networks, or other locations accessible to the backend servers 102, 120 (e.g., either directly or indirectly via network 140).

In general, the backend servers 102, 120 can be any server or system that stores, manages, and executes functionality associated with an on-demand platform, including assisting in establishing ad hoc collaboration business networks between two or more users or entities executing applications based on a common platform. In some instances, the backend servers 102, 120 may execute one or more business applications (e.g., 108 of FIG. 1). For example, each backend server 102, 120 may be a Java 2 Platform, Enterprise Edition (J2EE)-compliant application server that includes technologies such as Enterprise JavaBeans® (EJB), J2EE Connector Architecture (JCA), Java Messaging Service (JMS), Java Naming and Directory Interface (JNDI), and Java Database Connectivity (JDBC). In some instances, each of the backend servers 102, 120 may store a plurality of various applications, while in other instances, the backend servers 102, 120, and 130 may be dedicated servers meant to store and execute certain business applications built based on the on-demand platform using the on-demand platform technology and on-demand platform business content. In some instances, the backend servers 102, 120 may include a web server or be communicably coupled with a web server, where one or more of the business applications associated with the backend servers 102, 120 represent web-based (or web-accessible) applications accessed and executed through requests and interactions received on the front-end client 150a-b operable to interact with the programmed tasks or operations of the corresponding on-demand platform and/or business applications.

At a high level, the backend servers 102, 120 include an electronic computing device operable to receive, transmit, process, store, or manage data and information associated with the environment 100. The backend servers 102, 120 illustrated in FIG. 1 can be responsible for receiving requests from one or more front-end clients 150a-b (as well as any other entity or system interacting with the backend servers 102, 120, including desktop or mobile client systems), responding to the received requests by processing said requests in an on-demand platform and/or an associated business application, and sending the appropriate responses from the appropriate component back to the requesting front-end client 150a-b or other requesting system. Components of the backend servers 102, 120 can also process and respond to local requests from a user locally accessing the backend servers 102, 120. Accordingly, in addition to requests from the front-end client 150a-b illustrated in FIG. 1, requests associated with a particular component may also be sent from internal users, external or third-party customers, and other associated business applications, business processes, as well as any other appropriate entities, individuals, systems, or computers. In some instances, either or both an on-demand platform and/or a business application may be web-based applications executing functionality associated with a networked or cloud-based business process.

As used in the present disclosure, the term "computer" is intended to encompass any suitable processing device. For example, although FIG. 1 illustrates three backend servers 102, 120, environment 100 can be implemented using any number of servers, as well as computers other than servers, including a server pool. Indeed, the backend servers 102, 120 may be any computer or processing device such as, for example, a blade server, general-purpose personal computer (PC), Macintosh®, workstation, UNIX®-based workstation, or any other suitable device. In other words, the present disclosure contemplates computers other than general purpose computers, as well as computers without conventional operating systems. Further, the illustrated backend servers 102, 120 may be adapted to execute any operating system, including Linux®, UNIX®, Windows®, Mac OS®, or any other suitable operating system.

The first backend server 102 is illustrated in details in FIG. 1. The first backend server 102 includes an interface 104, a processor 106, a memory 110, a business application 108, and other components further illustrated in FIG. 2. In some instances, the backend servers 102, 120 and its illustrated components may be separated into multiple components executing at different servers and/or systems. For example, while FIG. 1 illustrates the business application 108 and the processor 106 as separate components, other example implementations can include the processor 106 within a separate system, as well as within as part of the business application's inherent functionality. Thus, while illustrated as a single component in the example environment 100 of FIG. 1, alternative implementations may illustrate the backend servers 102, 120 as comprising multiple parts or portions accordingly.

FIG. 1 depicts a server-client environment, but could also represent a cloud computing network. Various other implementations of the illustrated environment 100 can be provided to allow for increased flexibility in the underlying system, including multiple business network coordinator systems performing or executing one or more additional or alternative instances of networked applications and associated with a business application 108 for one or more different platforms, as well as multiple instances of the business application 108 and its related functionality. In those instances, the different backend servers 102, 120 and front-end clients 150a-b may communicate with each other via a cloud-based network or through the connections provided by network 140.

In FIG. 1, the interface 104 is used by the first backend server 102 to communicate with other systems in a client-server or other distributed environment (including within environment 100) connected to the network 140 (e.g., one of the front-end clients 150a-b, as well as other clients or backend servers communicably coupled to the network 140). The term "interface" 104, 178a-c generally includes logic encoded software and/or hardware in a suitable combination and operable to communicate with the network 140. More specifically, the interface 104 may comprise software supporting one or more communication protocols associated with communications such that the network 140 or the interface's hardware is operable to communicate physical signals within and outside of the illustrated environment 100. Generally, the backend servers 102, 120 may be communicably coupled with a network 140 that facilitates wireless or wireline communications between the components of the environment 100 (i.e., among the backend servers 102, 120 and/or one or more front-end clients 150a-b), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the components associated with the backend servers 102, 120 may be included within the network 140 as one or more cloud-based services or operations.

The term "network" refers to all or a portion of an enterprise or secured network, while in another instance, at least a portion of the network 140 may represent a connection to the Internet. In the illustrated example, at least a portion of the network 140 includes a portion of a cellular or mobile data network or other network capable of relaying SMS messages. In some instances, a portion of the network 140 may be a virtual private network (VPN). Further, all or a portion of the network 140 can include either a wireline or wireless link. Example wireless links may include 802.11a/b/g/n, 802.20, WiMax®, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the first backend server 102 includes a processor 106. Although illustrated as a single processor 106 in the backend server 102, two or more processors may be used in the backend server 102 according to particular needs, desires, or particular embodiments of environment 200. The backend servers 120 and 102, as well as other backend systems, may similarly include one or more processors. The term "processor" refers to a central processing unit (CPU), a blade, an application specific integrated circuit (ASIC), a field-programmable gate array (FPGA), or another suitable component. Generally, the processor 106 executes instructions and manipulates data to perform the operations of the backend server 102, and, specifically, the functionality associated with the corresponding business application 108. In one implementation, the server's processor 106 executes the functionality required to receive and respond to requests and instructions from the front-end client 150a-b, as well as the functionality required to perform the operations of the associated business application 108 and an on-demand platform, among others.

At a high level, the term "business application" and "networked application" described in this specification refer to any application, program, module, process, or other software that may execute, change, delete, generate, or otherwise manage information associated with the backend server 102 or the client device 150a-b, and in some cases, a business process performing and executing business process-related events. In particular, business processes communicate with other users, applications, systems, and components to send, receive, and process events. In some instances, a particular business application 108 may operate in response to and in connection with one or more requests received from an associated client or other remote client. Additionally, a particular business application 108 may operate in response to and in connection with one or more requests received from other business applications external to the backend server 102. In some instances, the business application 108 can be a networked application, for example, the business application 108 is built on a common platform with one or more applications in either or both of the backend servers 120 and 102. In some instances, the business application 108 may request additional processing or information from an external system or application. In some instances, each business application 108 may represent a web-based application accessed and executed by the front-end client 150a-b via the network 140 (e.g., through the Internet, or via one or more cloud-based services associated with the business application 108).

Further, while illustrated as internal to the backend server 102, one or more processes associated with a particular business application 108 may be stored, referenced, or executed remotely. For example, a portion of a particular business application 108 may be a web service that is remotely called, while another portion of the business application 108 may be an interface object or agent bundled for processing at a remote system. Moreover, any or all of a particular business application 108 may be a child or sub-module of another software module or enterprise application (e.g., the backend servers 120 and 130). Still further, portions of the particular business application 108 may be executed or accessed by a user working directly at the backend servers 102, as well as remotely at corresponding front-end client 150a-b.

Regardless of the particular implementation, "software" may include computer-readable instructions (e.g., programming code), firmware, wired or programmed hardware, or any combination thereof on a tangible and non-transitory medium operable when executed to perform at least the processes and operations described herein. Indeed, each software component may be fully or partially written or described in any appropriate computer language including C, C++, Java®, Visual Basic®, assembler, Perl®, any suitable version of 4GL, as well as others. It will be understood that while portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components, as appropriate. In the illustrated environment 100, the processor 106 executes the corresponding business application 108 stored on the associated backend servers 120. In some instances, a particular backend server may be associated with the execution of two or more business applications (and other related components), as well as one or more distributed applications executing across two or more servers executing the functionality associated with the backend servers.

FIG. 1 further includes memory 110 in the backend server 102. For example, the backend server 102 can host a master application for a particular data object, which is stored at the memory 110. The data object stored at the memory 110 may be accessed by other networked applications, for example, by applications of the backend servers 120 and 102. The data access does not require data replication and therefore can be stored at a single location (i.e., the memory 110). In addition, the memory 110 of the backend server 120 stores data and program instructions for the business application 108. The term "memory" refers to any memory or database module and may take the form of volatile or non-volatile memory including, without limitation, magnetic media, optical media, random access memory (RAM), read-only memory (ROM), removable media, or any other suitable local or remote memory component.

Figure 2:
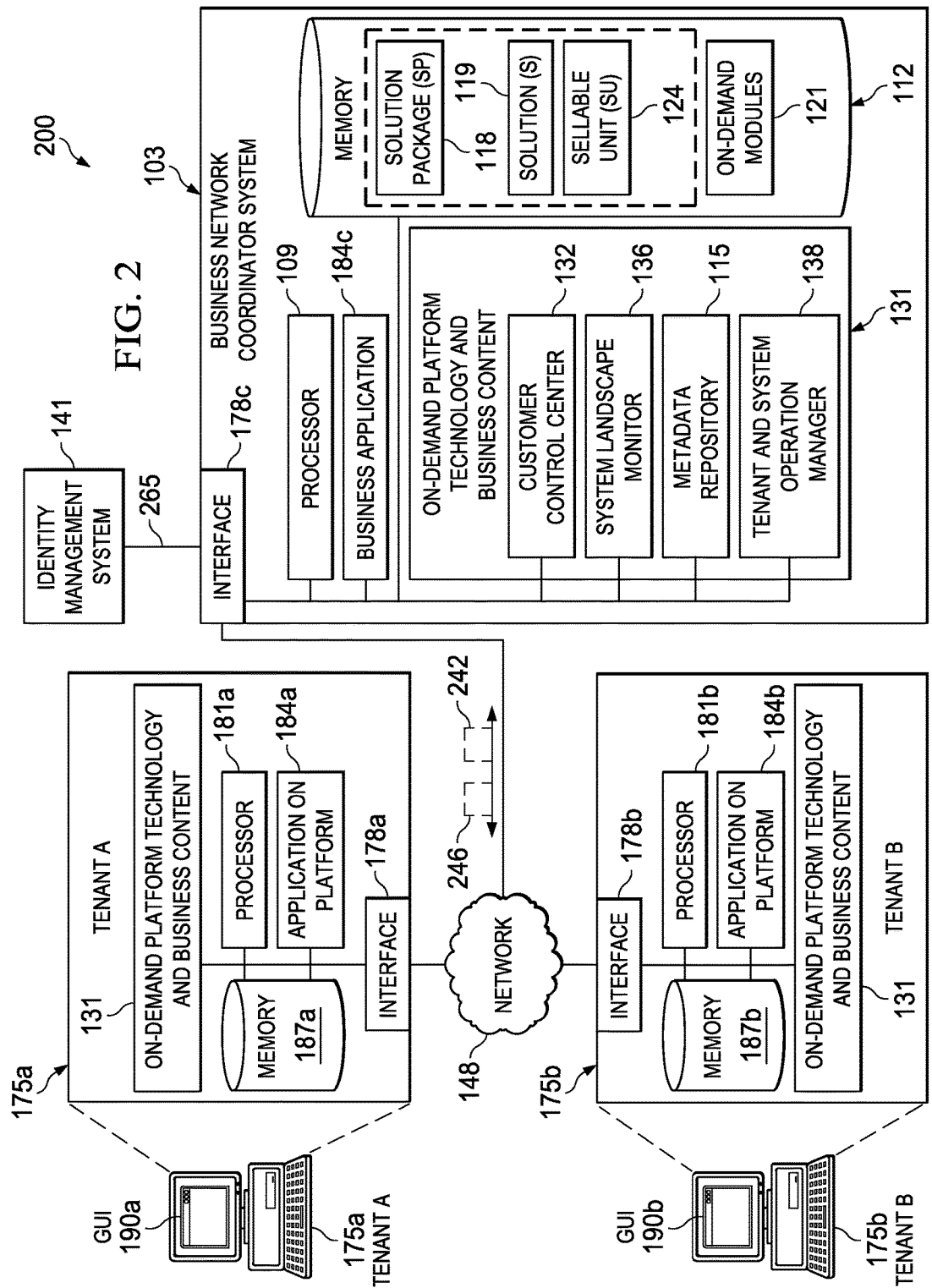
FIG. 2 illustrates an example environment for implementing various features of a system for providing a remote device remote access to software functions.

The memory 110 may store various objects, object models, and data, including classes, frameworks, applications, backup data, business objects, jobs, web pages, web page templates, database tables, process contexts, repositories storing services local to the backend server 120 and any other appropriate information including any parameters, variables, algorithms, instructions, rules, constraints, or references thereto associated with the purposes of the backend server 120 and its functionality. In some implementations, including in a cloud-based system, some or all of the memory 110 may be stored remote from the backend server 120 and communicably coupled to the backend server 120 for usage. As described above, memory 110 can include one or more meta-models associated with various objects included in or associated with the underlying platform. Specifically, memory 110 can store items and entities related to the business application 108 and/or other collaboration-related entities or components. Some or all of the elements illustrated within memory 110 may be stored external to the memory 110. These items may be made accessible to the business application 108 as illustrated in FIG. 2. In an aspect, the term "business object" is a representation of an intelligible business or non-business entity, such as an account, an order, employee, an invoice or a financial report.

FIG. 2 illustrates an example environment 200 for implementing various features of a system for establishing a business network using shared platform. The illustrated environment 200 includes, or is communicably coupled with, a business network coordinator system 103 which takes a coordinator role in a cloud-computing environment and one or more tenants: e.g. tenant A 175a and tenant B 175b. In an aspect, the business network coordinator system 103 may be one or more application servers, such as backend servers 102, 120 in FIG. 1 or servers 402, 403 in FIG. 4. In some instances, the tenants 175a, 175b may co-reside on a single server or system, as appropriate, or may each be one of the front-end clients 150a-b illustrated in FIG. 1. The tenants A 175a and B 175b may be associated with a particular business application 108, 184 or development context, as well as a particular platform-based application system. Each tenant A 175a and B 175b may be any computing device operable to connect to or communicate with at least one of the business network coordinator system 103 using a wireline or wireless connection via the network 148, or another suitable communication means or channel. In some instances, the tenants A 175a and B 175b may be a part of or associated with a business process involving one or more of the business applications 184c, or alternatively, a remote developer of associated with the platform or a related platform-based application. In general, each tenant A 175a and B 175b includes a processor 181a-b, an interface 178a-b, an application on platform 184a-b, a graphical user interface (GUI) 190a-b, and a memory 187a-b. In an aspect, the tenants 175a-b may store tenant-specific data (e.g., respective tenant identifiers) in memory 187a-b and may send 242 this tenant-specific data to the business network coordinator system 103 for receiving remote access to software functions as described herein in the context of the "one-tenant" architecture. In some instances, tenants A 175a and B 175b may be located on a single server in a co-tenancy environment. In those instances, the tenants 175a, b may share some or all of the resources of the server to perform their corresponding operations.

The GUIs 190a-b associated with each tenant A 175a and B 175b may comprise a graphical user interface operable to, for example, allow the user of a tenants A 175a and B 175b to interface with at least a portion of the business application 184c, the on-demand platform 131, and their associated operations and functionality. Generally, the GUI 190a-b provides the particular user with an efficient and user-friendly presentation of business data provided by or communicated within the system. The GUI 190a-b may comprise a plurality of customizable frames or views having interactive fields, pull-down lists, and buttons operated by the user. For example, the GUI 190a-b may provide interactive elements that allow a user to interact with a particular component within and/or external to environment 200. Different portions of the corresponding component's functionality may be presented and accessible to the user through the GUI 190a-b, such as through an application on platform 184a-b (e.g., a web browser). Generally, the GUI 190a-b may also provide general interactive elements that allow a user to access and utilize various services and software functions of a particular component. In some instances, the application on platform 184a-b may be used to access various portions of different platform-based application systems or the business network coordinator system 103. In some instances, the application on platform 184a-b may be an agent or client-side version of the business application 184c or other suitable component.

Each of the tenants A 175a and B 175b includes a business application on platform 184a and 184b. The business application on platform 184a and 224 can be realized on a web browser running on a remote computer. As an end user of an SaaS, the tenants A 175a and B 175b can access various modules of the business applications 184a-b without previous local installation of the business applications 184a-b, as components of the business application on platforms 184a or 184b can be remotely accessed or downloaded 246 based on the demand of the tenant A 175a and B 175b.

At least some of the communications between the business network coordinator system 103 and the tenants A 175a and B 175b may be performed across or via network 148. In general, environment 200 depicts an example configuration of a system for establishing business networks using applications built on a shared platform in a cloud computing environment, such as environment 200. The illustrated system includes development technology and hosted and managed services and applications built on top of the underlying platform technology. The business network coordinator system 103 represents a dedicated and/or ad hoc system built using the platform technology for coordinating collaboration with other systems associated with and executing on platform-related technology. The coordinating system is used to manage and operate the system and tenants belonging to the cloud computing environment, providing knowledge of and connections to the various systems, clients, and tenants therein. The environment 200 is an example and, in alternative implementations, the elements illustrated in FIG. 2 may be included in or associated with different and/or additional servers, clients, networks, and locations other than those as shown. For example, one or more of the components illustrated within the business network coordinator system 103 may be located in multiple or different servers, cloud-based or cloud computing networks, or other locations accessible to the business network coordinator system 103 (e.g., either directly or indirectly via network 148).

In general, the business network coordinator system 103 is any server or system that stores, manages, and executes functionality associated with an on-demand platform, including assisting in the establishing ad hoc collaboration business networks between two or more users or entities executing applications based on a common platform. In some instances, the business network coordinator system 103 may execute one or more business applications 120. For example, each business network coordinator system 103 may be one of the backend servers 102, 120 and 130 illustrated in FIG. 1. In some instances, each business network coordinator system 103 may store a plurality of various applications, while in other instances, business network coordinator systems 103 may be dedicated servers meant to store and execute the business applications 184c, which is built based on the on-demand platform technology and business content 131 ("on-demand platform") using the on-demand platform technology and on-demand platform business content. The coordinator, or central, system 103 may be one or more dedicated application servers for managing all systems/tenants that are part of a cloud computing environment. In some instances, the business network coordinator system 103 may comprise a web server or be communicably coupled with a web server, where one or more of the business applications 184c associated with the business network coordinator system 103 represent web-based (or web-accessible) applications accessed and executed through requests and interactions received on the tenants A 175a and B 175b (i.e., via applications 184a-c) operable to interact with the programmed tasks or operations of the corresponding on-demand platform 131 and/or business applications 184c.

The business network coordinator system 103 illustrated in FIG. 2 can be responsible for receiving application/software function requests 240 from one or more tenants A 175a and B 175b (as well as any other entity or system interacting with the business network coordinator system 103, including desktop or mobile client systems), responding to the received requests by processing said requests in the on-demand platform 131 (e.g., store server 402 of FIG. 4) and/or the associated business application 184c, and sending the appropriate responses 246 from the appropriate component back to the requesting tenants A 175a and B 175b or other requesting system. The business network coordinator system 103 may perform a central landscape server's functionality, e.g. the functionality of cloud solutions landscape directories. Such functionality may comprise storing data packages associated with service extensions, making available the data packages to various platforms that are based on various technologies, and monitoring the network landscape by the system landscape monitor 136.

Components of the business network coordinator system 103 can also process and respond to local requests 242 from a user locally accessing the business network coordinator system 103. Accordingly, in addition to requests 242 from the tenants A 175a and B 175b illustrated in FIG. 2, requests associated with a particular component may also be sent from internal users, external or third-party customers, and other associated business applications, business processes, as well as any other appropriate entities, individuals, systems, or computers. In some instances, either or both of the on-demand platform 131 and/or the business application 184c may be web-based applications executing functionality associated with a networked or cloud-based business process.

FIG. 2 depicts a server-tenant environment, but could also represent a cloud computing network. Various other implementations of the illustrated environment 200 can be provided to allow for increased flexibility in the underlying system, including multiple business network coordinator systems 103 performing or executing one or more additional or alternative instances of the on-demand platform 131 and associated with a business application 184c for one or more different platforms, as well as multiple instances of the business application 184c and its related functionality. In those instances, the different business network coordinator systems 103 may communicate with each other via a cloud-based network or through the connections provided by network 148.

As illustrated in FIG. 2, the interface 106 enables an identity management system 141 to connect with the business network coordinator system 103 via a registry connection 265. The identity management system 141 may be used to identify users (e.g., tenants A or B) to whom access to shared data is granted when they access shared data across systems or tenants. The usage of one or more identity management systems provides support for single sign-on services to be supported To avoid re-authentication, the identity management system 141 can provide the required user mapping. The business network coordinator system 103 may further include internal or external memory 112, which stores software solution packages (SP) 118 as discussed in context of FIG. 3, wherein a solution package 118 may comprise one or more software solutions 119 and optionally one or more sellable units (SU) 124. Remote access to one or more of the software components 118, 119, 124 may be provided 246 via network 148 to tenants 175a-b upon a request received 242 from the tenants 175a-b at the business network network coordinator system 103.

The identity management system 141 can identify and manage users (related to particular tenants) in a system (such as a country, a network, or an organization) and control access to the resources in that system by placing restrictions on the established identities of the tenants. The identity management system 141 can be multidisciplinary and covers many dimensions, such as technical, legal, security and organizational dimensions. In some implementations, an identity can be constructed from a small set of axiomatic principles. For example, all identities in a given abstract namespace may be unique and distinctive, and/or such identities can bear a specific relationship to corresponding entities in the real world. An axiomatic model of this kind can be considered to express "pure identity" in the sense that the model is not constrained by the context in which it is applied. In general, an entity and/or user can have multiple identities, and each identity can consist of multiple attributes or identifiers, some of which are shared and some of which are unique within a given name space. The identity management system 141 can perform and/or support user mapping to the same identity, removing a need to re-authenticate uses when the same identity attempts access over a particular tenant or system, such as when accessing collaboration data on different systems. In some instances, the identity management system 141 may be communicably coupled to the business network coordinator system 103 via network 148.

Generally, the business network coordinator system 103 may be communicably coupled with a network 148 that facilitates wireless or wireline communications between the components of the environment 200 (i.e., between the business network coordinator system 103 and/or one or more tenants A 175a and B 175b), as well as with any other local or remote computer, such as additional clients, servers, or other devices communicably coupled to network 148, including those not illustrated in FIG. 2

In the illustrated environment 200, each processor 109 executes the corresponding on-demand platform 131 and the business application 148c stored on the associated business network coordinator system 103. In some instances, a particular business network coordinator system 103 may be associated with the execution of two or more business applications 184c (and other related components), as well as one or more distributed applications executing across two or more servers executing the functionality associated with the business network coordinator system 103. Further, while illustrated as internal to the business network coordinator system 103, one or more processes associated with a particular business application 184c may be stored, referenced, or executed remotely. For example, a portion of a particular business application 184c may be a web service that is remotely called, while another portion of the business application 184c may be an interface object or agent bundled for processing at a remote system (not illustrated) or a particular tenant A 175a or B 175b (e.g., the application on platform 184a-b). Moreover, any or all of a particular business application 120 may be a child or sub-module of another software module or enterprise application (not illustrated) without departing from the scope of this disclosure. Still further, portions of the particular business application 184c may be executed or accessed by a user working directly at the business network coordinator system 103, as well as remotely at corresponding tenants A 175a and B 175b.

The illustrated business application 184a-c may be created and developed based on an underlying software platform or platform layer, which can be used to provide functionality defined by the platform, as well as additional functionality available by building software applications upon the platform layer using components and entities designed or adapted for use with the platform. By creating the additional functionality, the platform can be extended and added to by a plurality of developers, providing for a fluid means of enhancement. In an aspect, the business application 184*a-c* are enhanced by environment 400, as described below in context of FIG. 4.

In some instances, additional applications can be built on top of the original system by many different developers and development teams to create new products and software. The on-demand platform 131 and its corresponding consolidated on-demand platform can maintain a metadata repository 115 storing information on the various models and their associated definitions and metadata across an entire development ecosystem, while the on-demand platform 131 may be used on which to create or to base newly developed applications or software functions such as solution packages (SP), solutions (S), or sellable units (SU) as described in context of FIGS. 3-9.

In some implementations, the business network coordinator system 103 may include a customer control center 132, a system landscape monitoring 136, a tenant and system operations manager 138, and a collaboration and metadata repository 115. The tenant B 175*b* can be connected to the business network coordinator system 103 as a potential collaboration partner. The exact released and accessible data are defined and controlled via a user authorization mechanism provided via the on-demand platform on which the business applications 184*a-b* are based. The business network coordinator system 103 may include the on-demand platform. A functional- and instance-based authorization module, which is part of the on demand platform 131, can ensure that users can access only the activated software functions (e.g., in SP, S, SU), where the particular user is authorized to view the activated software functions. The activated or deactivated software functions and services can be managed centrally via the collaboration and data sharing work center provided in the business applications 184*a-b*.

In general, the customer control center 132 provides one or more application programming interfaces (APIs) to the tenants A 175*a* and B 175*b* for accessing the operations of the on-demand platform 131 remotely. In some instances, use of one or more APIs at the Customer control center 132 can allow for pre-publishing of one or more models to and/or from the business network coordinator system 103 of FIG. 2. The customer control center 132 allows tenants, such as the tenants A 175*a* and B 175*b*, access to the on-demand platform 131, and vice versa. The customer control center 132 may include a graphical user interface for selection of administration tools. For example, the tenants may monitor system health, retrieve system information, execute maintenance program, analyze system performance, improve execution procedure, organize files and information, and perform other control tasks via the customer control center 132. In some aspects, the customer control center 132 enables collaboration functionalities when tenants, such as the tenants A 175*a* and B 175*b*, access and operate on the on-demand platform 131 via the customer control center 132.

The system landscape monitor 136 can monitor operations, modules, and activities of the business network coordinator system 103, as well as those systems associated with the business network coordinator system 103, including the tenants 175*a,b* and other systems and applications. The system landscape monitor 136 may be accessed by tenants such as the tenants A 175*a* and B 175*b*. In some implementations, the system landscape monitor 136 can collect and present a list of active tenants using the on-demand platform 131. The system landscape monitor 136 may categorize the active tenants by areas of business, technology, market orientation, and other aspects of the tenants. In some implementations, the system landscape monitor 136 can show resource distribution or allocation or both within the business network coordinator system 103 and enable administrators or tenants with administrator rights to modify and improve the resource distribution or allocation or both.

The tenant and system operation manager 138 may support communications between tenants, such as tenants A 175*a* and B 175*b* and the business network coordinator system 103. The tenant and system operation manager 138 can manage central instances of network establishments between tenants and enable the business network coordinator system 103 to monitor the network traffic upon establishment agreement from all participants.

FIG. 2 further includes memory 112. The memory 112 of the business network coordinator system 103 stores data and program instructions, as well as metadata associated with the solution packages 118, solutions 119, sellable units 124, and the on-demand platform 131. In some implementations, including in a cloud-based system, some or all of the memory 112 may be stored remote from the business network coordinator system 103, and communicably coupled to the business network coordinator system 103 for usage. As described above, memory 112 can include one or more meta-models associated with various objects included in or associated with the underlying platform. Specifically, memory 112 can store items and entities related to the on-demand platform 131 and/or other collaboration-related entities or components. Some or all of the elements illustrated within memory 112 may be stored external to the memory 112. These items may be made accessible to the on-demand platform 131.

The on-demand modules 121 in memory 112 may include various functionalities of the business network coordinator system 103, and can be selectively provided to some or all of the tenants. As previously described, the on-demand modules 121 in the business network coordinator system 103 may include CRM, FM, PM, SCM, SRM, HRM, EMS, CM, and others. In case of CRM in the on-demand module 121, the business network coordinator system 102 may be the CRM server 402 in FIG. 4. For example, tenant A 175*a* may request services of a subset of the on-demand modules 121 from the application on platform 184*a*, such as CRM, HRM, and EMS. Tenant B 175*b* may request a different subset of the on-demand modules 121 on the application platform 184*b*, such as FM, HRM, and EMS.

Figure 3:
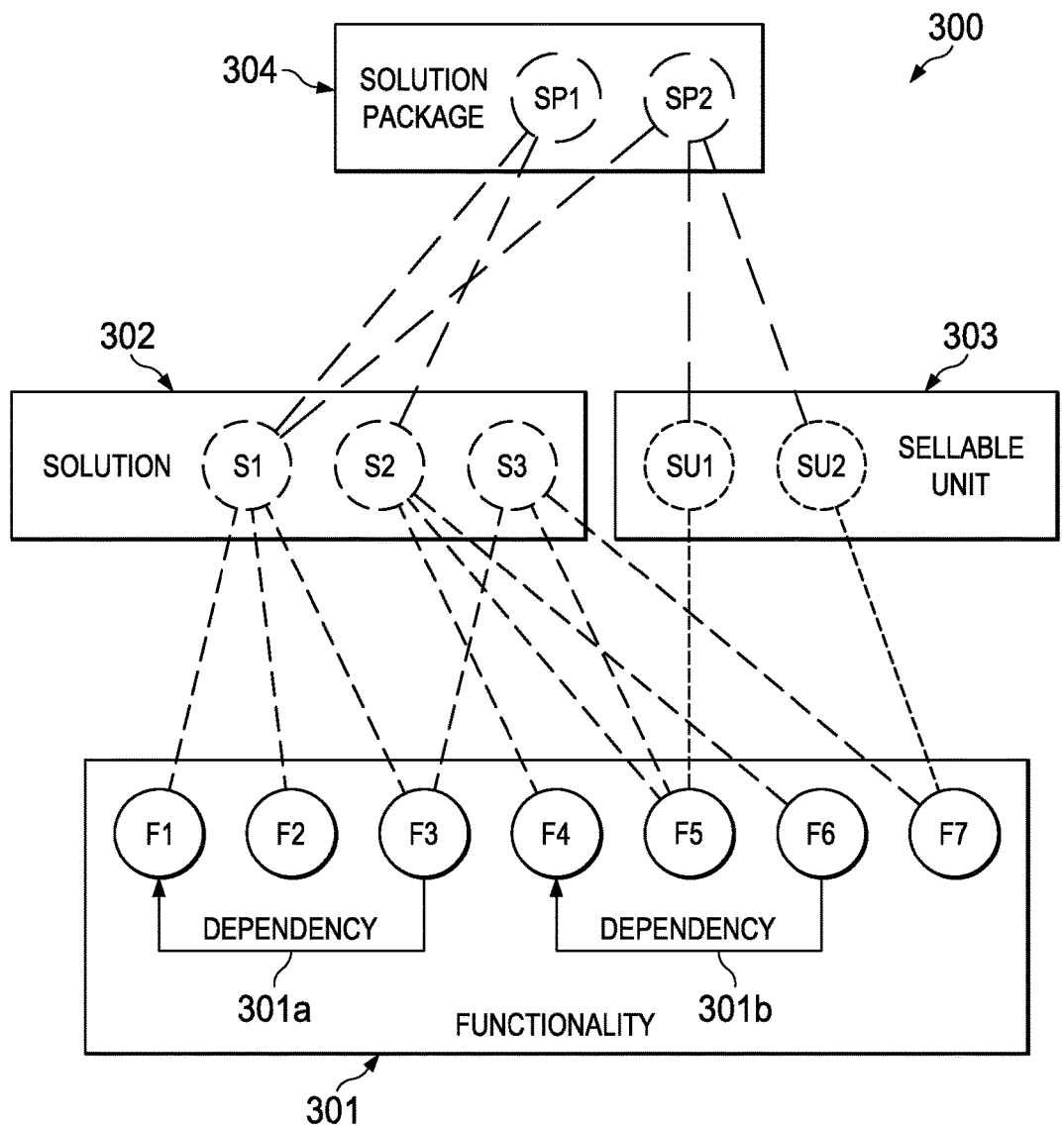
FIG. 3 describes an exemplary classification of software functionalities, whose access can be provided to the remote device or tenant FIG. 4 describes an exemplary implementation for providing a tenant remote access to multiple software functions that can dynamically be switched on or off.

Turning now to FIG. 3. FIG. 3 describes an exemplary classification of software functionalities, whose access can be provided to the remote device or tenant. In an aspect, a "solution" (S, 302) S1, S2, S3 is a bundle of software functionalities (F, 301) F1-F7 with its own branding and with a price tag for the solution. In its programming code it is clearly defined what is in scope for this solution and what is (in some cases, without up-selling) not in scope of this solution. There may be user interfaces included in its functionalities. Inside a solution the customer may select between different business scenarios and scenario variants. A customer may buy additional functionality ("sellable unit", SU) and enhance the functional scope of his solution. A customer may have several solutions in use in parallel. Examples of a solution are SAP Business ByDesign, SAP Financials OnDemand, SAP Travel OnDemand, SAP Sales & Service OnDemand.

In an aspect, a "solution package" (SP, 304) SP1, SP2 may combine software functionalities F1-F7 from more than one solution S1-S3 offered for a dedicated price. The customer gets a collection of functionality F1-F7 with a certain solution package SP1, SP2. This can be achieved by combining several solutions in one SP or combining a solution with several sellable units. A solution package may not contain more functionality than the sum of solution functionalities.

In an aspect, a "sellable unit" (SU, 303) SU1, SU2 includes software functionality F1-7, which can be added to the scope of a solution (S) after an buying process. The sellable unit (SU) may be a value-added feature "on top" of a solution (S). This may allow enhancing of software functions of solutions with software functions of sellable units and provide remote access to such enhanced software packages to the tenant. The term "software function" may thereby be any data processing step. The software functions may show dependencies 301a-b, such as data processing steps that require data input from other the output of other functions F1-7. Before buying the SU, the SU's functionality is not available/visible for the customer. A SU is a self-contained optional functionality. The SU might have a pre-requisite in order to be used. Some functionality can be a sellable unit for one solution but standard functionality for another solution. A sellable unit is enhancing the basic functionality of a solution or it is the foundation for additional scenarios/scenario variants in this solution. A SU may not be usable without having a solution (S) activated. For example, the "solution" (S) may be a software function (e.g., programming code) that is self-contained and may be run independently to other functions, while the SU may need to be attached to or embedded in programming code of one or more "solutions" (S). The solution product owner may need to decide what are the sellable units which are to be offered. It might be that a sellable unit is just included in a solution or solution packages but not as own item which can be bought and run stand alone.

In an example aspect, an SP may be SAP Financials OnDemand plus Activity Management, or SAP Financials OnDemand plus Expense Reporting, or SAP Financials OnDemand plus Expense Reporting plus Travel Planning. In FIG. 3, solution package SP2 is provided to the remote device (tenant) and comprises solution S1 as well as sellable units SU1 and SU2. S1 comprises software functions F1-3, wherein function F3 depends on function F1. SU1 includes software function F5, which is also part of solutions S2 and S3, which are not part of solution package SP2. SU2 includes function F7, which is part of solution S3. Software function F5 may be offered as sellable unit SU1 as long as it does not have a pre-requisite (dependency) which is not supported by S1. In this example F6 may not be a sellable unit because F4 is required (which is not part of 51.

Figure 4:
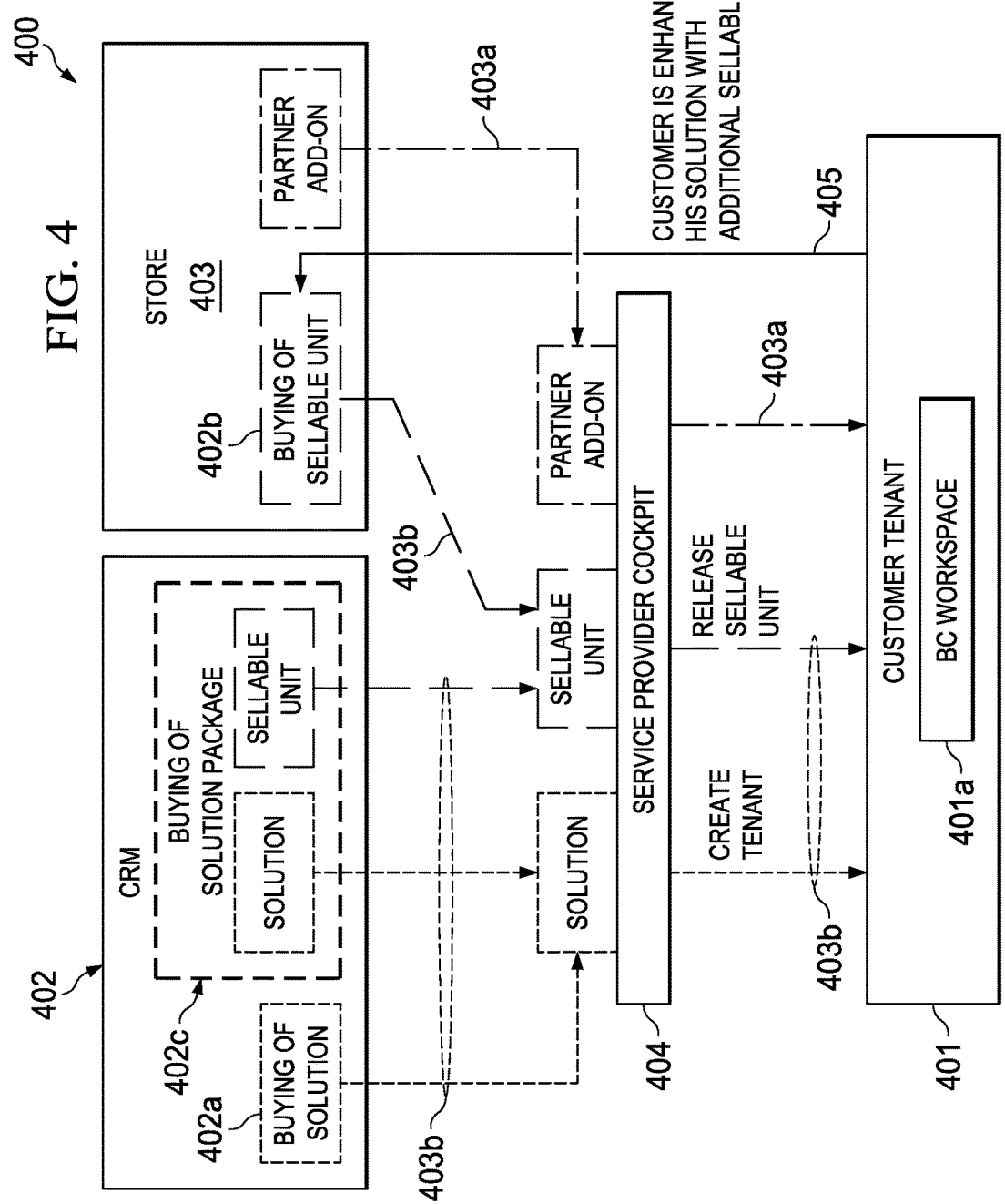

Turning now to FIG. 4. FIG. 4 shows an exemplary implementation for providing a tenant remote access to multiple software functions that can dynamically be switched on or off. Environment 400 may be environment 200 of FIG. 2, e.g., a network such as a cloud computing environment. Environment 400 may include tenant 401 (such as tenant 175a,b in FIG. 2), a CRM server 402, a store server 403 and a service provider cockpit server 404. CRM server 402, store server 403 and service cockpit provider 404 may be one or more servers, such as business network coordination system 103 in FIG. 2. The entities 401, 402, 403, 404 may be communicatively coupled by a wired or wireless communication within network 400.

In an example aspect, for the case of a new customer being interested in using one or more available software functions, the new customer may contact a sales person for a requested software function the customer desires. The sales person may place an order for the requested software function at the CRM server 402. The placement of the order may trigger a provisioning of the customer tenant 401. The CRM server may indicate the service provider cockpit 404 the requested software function (i.e., the solution (S) 402a, the sellable unit (SU) 402b, or the solution package (SP) 402c associated with the order of the customer). The service provider cockpit 404 may then create the tenant 401, and release the requested software function to the tenant 401. In an aspect, the tenant 401 may be provided with a business configuration (BC) workspace 401a, which may be a user interface on the tenant 401 indicating (e.g., displaying on a screen) software functions (e.g., along with their price to be paid) that have been ordered by the customer and optionally software functions which may be combined with the requested software functions, or which may be added to the existing software portfolio as an alternative software option.

In case the customer wants to add software functionality to his software portfolio, the customer may select at the BC workspace 401a one or more of the software functions, which have so far not been accessible by the customer. Such a requested "switch on" of an additional software function may result in a request 405 being placed at the store server 403, where the customer tenant 401 is recognized (e.g., by a customer identifier included in the request) and, after the customer paid the price, a release of the requested software function, i.e. the solution (S), the sellable unit (SU), or the solution package (SP) associated with the order of the request, is performed via the service provider cockpit 404. In general, the release of a software function may include transmitting access data 403b, such as a Product and Production Management System (PPMS) key determining if the most recent version of a software function is installed on a system, and can install or upgrade that package from a local or remote host. In an aspect, when the store server 403 recognizes the customer, it may augment the requested software function by an add-on software function 403a provided by a partner as a part of a loyalty program. The partner add-on software function 403a may be combinable with the software functions the tenant 401 has already remote access to or may be additional separate software functions that may operate independently from the other software functions accessed by the tenant 401.

In an aspect, one or more of servers 402, 403, 404 may perform operations, comprising: providing a list of second software functions to a first remote device that are not accessible by the remote device, wherein the remote device has remote access to a first software function; receiving from the remote device a request for a software function of the provided list of second software functions and upon receiving the request; providing the remote device remote access to the requested software function by transmitting access data for the requested software function to the remote device; after providing the remote access to the requested software function, receiving from the remote device a deactivation command for the requested software function or the first software function and, based on the deactivation command, deactivating the remote access of the remote device to the requested software function or the first software function. In an aspect, the operations may further comprise: after deactivating the remote access of the remote device to the requested software function or the first software function, receiving an activation command for the respective function and, based on the activation command, activating the remote access of the remote device to the respective function. In an aspect the remote access to the requested software function may comprise remote access to the first software function augmented by the requested software function.

In general, buying the software function process from the CRM server 402 or the store server 403 may trigger follow-on operations via the service provider cockpit server 404 into the customer tenant 401. Such follow-on operations may comprise accessing data that is locally stored on the remote device, processing the local data and forwarding the processed data from the requested software function to the first software function, or may include an automatic configuration in the tenant or generation of software artifacts. Additionally a first activation and/or configuration by the customer may be performed as follow-on operations.

Figure 5:
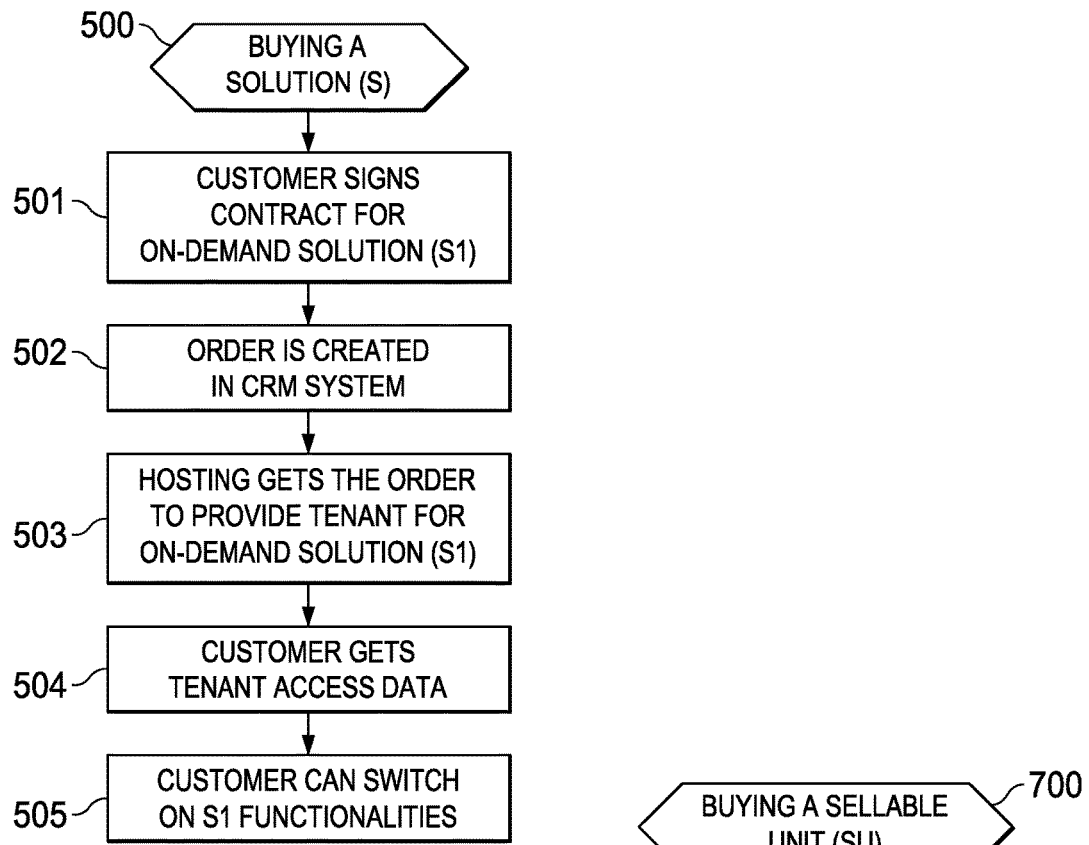
FIG. 5 illustrates an exemplary process of a customer buying a solution in the environment of FIG. 4.

Turning now to FIG. 5, which illustrates an exemplary process 500 of a customer buying a solution (S) in environment 400 of FIG. 4. At 501, the customer signs a contract for on-demand solution (S1). At 502, the order or request is created in CRM server 402. At 503, a hosting system (e.g., 402, 403, or 404) receives the order to provide tenant 401 for on-demand solution (S1). At 504, customer gets tenant access data 403b. At 505, the customer can switch on S1 functionalities.

Figure 6:
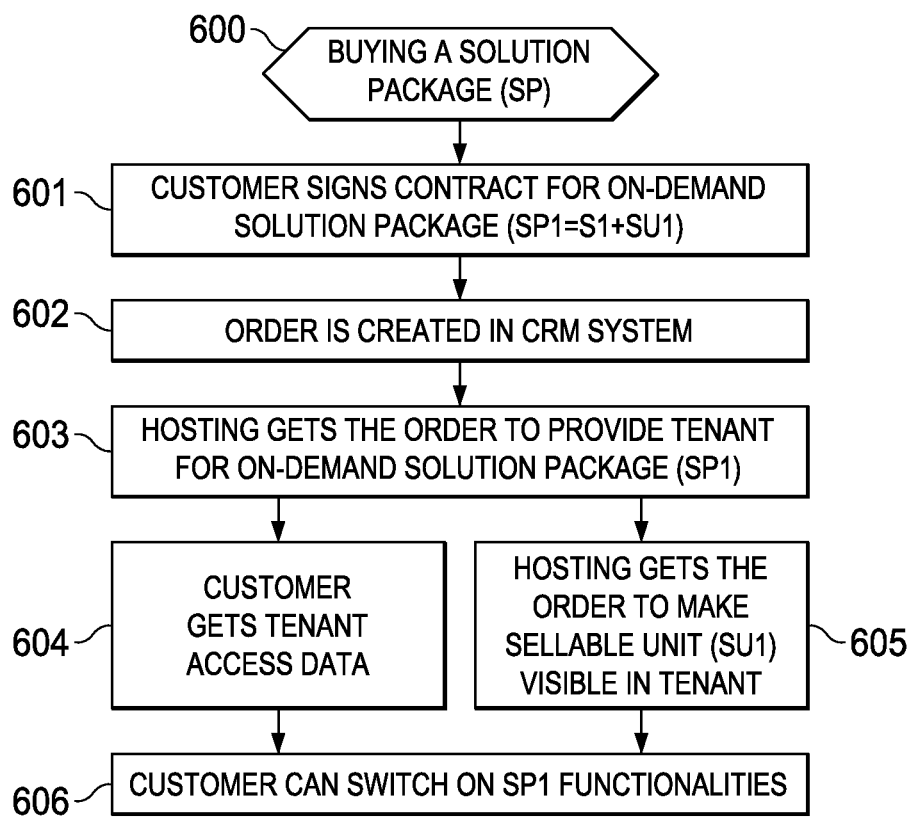
FIG. 6 illustrates an exemplary process of a customer buying a solution package in the environment of FIG. 4.

Turning now to FIG. 6, which illustrates an exemplary process 600 of a customer buying a solution package (SP) in environment 400 of FIG. 4. At 601, the customer signs contract for on-demand solution package (SP1=S1+SU1). At 602, the order or request is created in CRM server 402. At 603, a hosting system (e.g., 402, 403, or 404) gets the order to provide tenant 401 for on-demand solution package (SP1). At 604, customer gets tenant access data 403b, while at 605, hosting gets the order to make sellable unit (SU1) visible in tenant 401. At 606, the customer can switch on SP1 functionalities.

Figure 7:
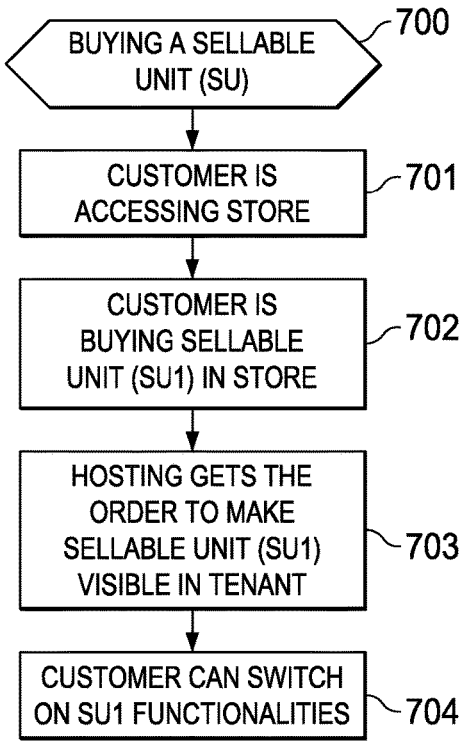
FIG. 7 illustrates an exemplary process of a customer buying a sellable unit in the environment of FIG. 4.

Turning now to FIG. 7, which illustrates an exemplary process 700 of a customer buying a sellable unit (SU) in environment 400 of FIG. 4. At 701, the customer is accessing the store 403. At 702, the customer is buying sellable unit (SU1) in store. At 703, a hosting system (e.g., 402, 403, or 404) gets the order to make sellable unit (SU1) visible in tenant 401. At 704, the customer can switch on SU1 functionalities.

Figure 8A:
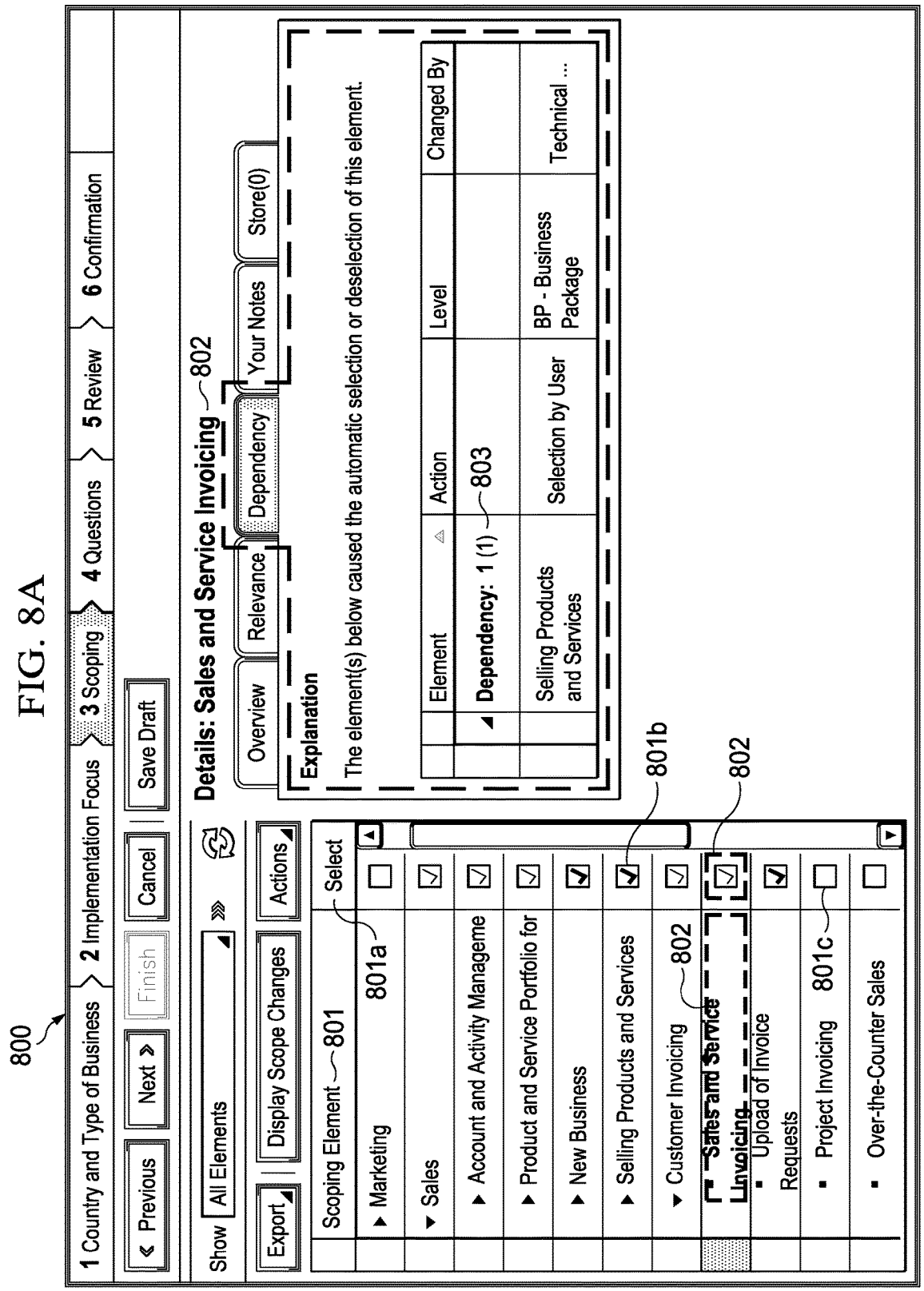
FIGS. 8A-8C illustrate an exemplary business configuration workspace user interface for dynamically switching on or off particular software functions.
Figure 8B:
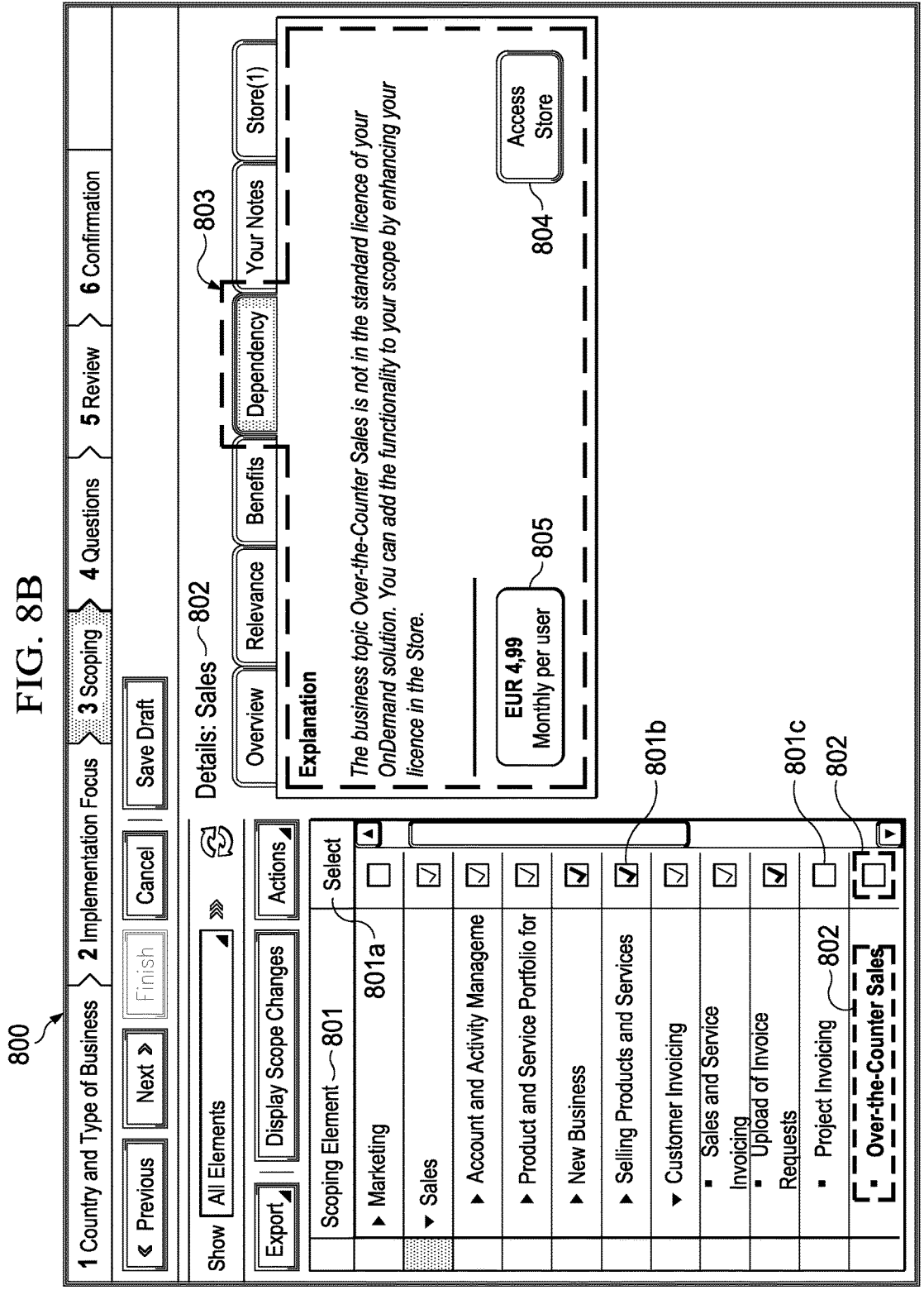
Figure 8C:
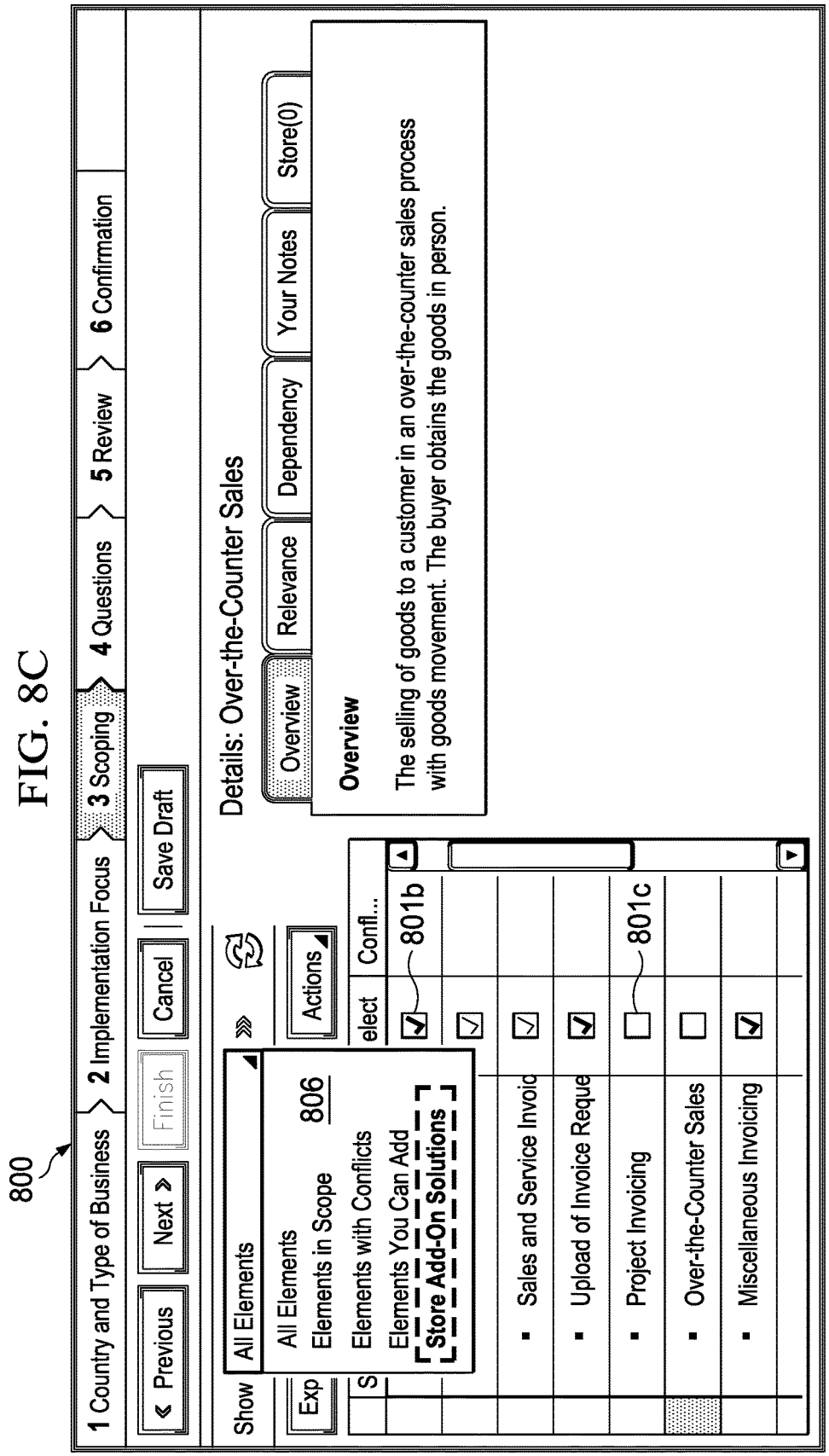

Turning now to FIGS. 8A-8C, which illustrate an exemplary business configuration workspace user interface (UI) 800 for selecting or deselecting software functions. The BC workspace UI 800 may comprise one or more icons 801a that are configured to be activated (e.g., selected) or deactivated (e.g., deselected) and that are associated with software functions 801 that may be purchased by the customer (e.g., by the user of the tenant 175a-b, 401). The customer may select/activate 801b or deselect/deactivate 801c some of the listed software functions 801. In an aspect, once a software function is selected 801b, a software function 802 related to the selected software function 801b may be suggested (e.g., by highlighting the related software function or by automatically activating/selecting the related software function 802. In an aspect, the BC workspace UI may indicate a dependency 803 of the related software function 802 in relationship to the selected/activated software function 801b of the one or more software functions 801. In an aspect, the selected/activated software function 801b may require data communication with the related software function 802. For example, the selected/activated software function 801b may require as input data from the output of the related software function 802. In an aspect, a deselected/deactivated software function 801c may require data communication with a related software function 802. For example, the related software function 802 may require as input data from the output of the deselected/deactivated software function 801c.

In an aspect, standard functionality of the BC workspace UI may offer a documentation of the functionality (Tab strip Overview, Relevance) and an explanation (per Scoping Element) why the related software function 802 is automatically selected or de-selected. In this example of FIG. 8A, the Business Topic Sales and Service Invoicing is automatically selected because Selling Products and Services Business Package is selected (e.g., by the customer). This Business Topic may not be de-selected as long as the Business Package is selected. The select icon 801a of this software function is accordingly in a greyish color, which indicates this for the user. In other examples there are scoping elements which may not be selected as long as other scoping elements are not selected. This is then indicated accordingly in the dependency tab strip 803.

In an aspect, the Business Topic Over-The-Counter Sales may be such a dedicated functionality which is not in the standard license of the current customer. As long as this functionality is not bought in store 403 the appropriate software function may not be selectable. This is indicated by icon 801a—here one may want to re-use the standard scoping UI behavior for Scoping software functions 801 which are automatically de-selected.

In FIG. 8B, the related software function 802 is an optional function, which can be used together (e.g., the activated software function 801b may be augmented by the related software function 802) with the already activated software function 801b. In an aspect, the related software function 802 is an optional function, which can be used in addition and/or in parallel to the already activated software function 801b. In an aspect, the dependency 803 to the already activated software function 801b may be provided to the tenant 175a-b, 401 for display on the UI 800. In an aspect, the customer may have the opportunity to access the store server 403 directly (e.g., via a button 804). As an option, the price 805 may already be displayed with the associated software function 801. In FIG. 8C, the BC workspace UI offers the opportunity to filter software functions. Additional filter may be offered to display the functionalities which are not included in the standard license or added to the standard license. In an aspect, an overview 806 may be provided, which indicates software functions which may have conflicts with other software functions 801, further software functions which may be purchased on-demand. In general, the BC workspace UI may be used for a configuration of the software functions, wherein it is visible on the BC workspace UI which software function may be additionally bought or ordered (or has already been bought or ordered) and where the additional software function may enhance the existing business processes. So in addition to FIG. 8B where it is shown that existing constraints may be used to determine what may be bought or ordered this filter in FIG. 8C may be a part of the process of augmenting software functions by additional software functions.

Turning to FIG. 9, FIG. 9 illustrates an exemplary method or process 900 for providing to a remote device 901 remote access to multiple software functions including a dynamic switch on/off of the software functions.

One or more servers 902 (e.g., CRM server 402, store server 403 or service provider cockpit 404 in FIG. 4), provision a list of software functions configured to be made remotely accessible to a remote device, such as customer tenant 901 (tenant 401 in FIG. 4 or tenant 175a,b in FIG. 2). One or more rules may be defined, which define which sellable units The tenant 901 may include one or more processors 901b and a business configuration workspace 401a, 901a.

At 904, the tenant 901 receives a list of accessible and non-accessible software functions.

At 905, the tenant 901 selects one or more software functions among the non-accessible software functions, and optionally deselecting one or more software functions among the accessible software functions.

At 906, the server 902 receives from the remote device a request for a software function of the provided list of second software functions. The request may include a payment for the requested software function according to a price which has been indicated in the list on the BC workspace 901a.

At 907, the server 902 recognizes the remote device and, based on the request, providing the remote device remote access to the requested software function, and optionally inactivating remote access of the deselected software function. In an aspect, the request may include an identifier of the customer tenant, which may be compared to a list of identifiers in a customer database connected to the server 902.

At 908, the server 902 transmits access data for the requested software function to the remote device 901 at which the access data is received.

At 909, the customer accesses the selected software function via the BC workspace 901a.

At 910, the tenant 901 selects one or more software functions among the non-accessible software functions, and/or deselects one or more software functions among the accessible software functions. Upon step 910, process steps 906, 907, 908 and 909 are repeated 911, or the process 900 ends.

The preceding figures and accompanying description illustrate example processes and computer implementable techniques. But environment 100, 200, 300 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100, 200, 300 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art.

What is claimed is:

1. A computer-implemented method for providing a remote device remote access to software functions, the method comprising the following operations performed by one or more servers:

providing a list of second software functions to a first remote device that are not accessible by the first remote device, wherein the first remote device has remote access to a first software function, the first software function and the second software functions representing functionality hosted centrally in a cloud-computing environment, the first remote device including a tenant system providing a set of cloud-hosted applications associated with an entity corresponding to the tenant system, the second software functions including additional functionality for enhancing existing functionalities of the first software function, the first software function hosted in the cloud-computing environment and to which the first remote device currently has remote access, and the second software functions in the list represent functionalities dependent upon the first software function;

in response to providing the list of second software functions, receiving from the first remote device a request for a software function of the provided list of second software functions and upon receiving the request, providing the first remote device remote access to the requested software function by transmitting access data for the requested software function to the first remote device, wherein the access data allows the first remote device to remotely incorporate, in the cloud-computing environment, the additional functionality of the requested software function from the list of second software functions into the first software function, and remotely incorporating the additional functionality of the requested software function comprises providing remote access to an augmented version of the first software function, the augmented version of the first software function comprising the first software function augmented by incorporating the dependent functionality of the requested software function with operations of the first software function; and after providing the remote access to the requested software function, receiving from the first remote device a deactivation command for the requested software function or the first software function and, based on the deactivation command, deactivating the remote access of the first remote device to the requested software function or the first software function.

2. The method of claim 1, wherein deactivating the remote access of the first remote device to the requested software function or the first software function comprises:

maintaining the remote access to the software function which is not deactivated.

3. The method of claim 1, wherein deactivating the remote access of the first remote device to the requested software function or the first software function comprises:

deactivating the remote access to the first software function while maintaining the remote access to the requested software function, or deactivating the remote access to the requested software function while maintaining the remote access to the first software function.

4. The method of claim 1, the operations further comprising:

after deactivating the remote access of the first remote device to the requested software function or the first software function, receiving an activation command for the respective function and, based on the activation command, activating the remote access of the first remote device to the respective function.

5. The method of claim 1, the operations further comprising:

providing an indication to the first remote device that the list of second software functions comprises one or more software functions that are configured to be combined with the first software function.

6. The method of claim 1, the operations further comprising:

providing the list of second software functions to a second remote device that are not accessible by the second remote device, wherein the second remote device has remote access to a third software function;

receiving from the second remote device a second request for the software function requested by the second remote device and upon receiving the second request, providing the second remote device, independently from the first remote device, remote access to the requested software function by transmitting second access data for the requested software function to the second remote device; and after providing the second remote device the remote access to the requested software function, receiving from the second remote device a deactivation command for the requested software function or the third software function and, based on the deactivation command, deactivating, independently from the first remote device, the remote access of the second remote device to the requested software function or the third software function.

7. A computer program product encoded on a non-transitory, tangible storage medium, the product comprising computer readable instructions for causing one or more computers to perform operations for providing a remote device remote access to software functions, the operations comprising:

providing a list of second software functions to a first remote device that are not accessible by the first remote device, wherein the first remote device has remote access to a first software function, the first software function and the second software functions representing functionality hosted centrally in a cloud-computing environment, the first remote device including a tenant system providing a set of cloud-hosted applications associated with an entity corresponding to the tenant system, the second software functions including additional functionality for enhancing existing functionalities of the first software function, the first software function hosted in the cloud-computing environment and to which the first remote device currently has remote access, and the second software functions in the list represent functionalities dependent upon the first software function;

in response to providing the list of second software functions, receiving from the first remote device a request for a software function of the provided list of second software functions and upon receiving the request, providing the first remote device remote access to the requested software function by transmitting access data for the requested software function to the first remote device, wherein the access data allows the first remote device to remotely incorporate, in the cloud-computing environment, the additional functionality of the requested software function from the list of second software functions into the first software function, and remotely incorporating the additional functionality of the requested software function comprises providing remote access to an augmented version of the first software function, the augmented version of the first software function comprising the first software function augmented by incorporating the dependent functionality of the requested software function with operations of the first software function; and after providing the remote access to the requested software function, receiving from the first remote device a deactivation command for the requested software function or the first software function and, based on the deactivation command, deactivating the remote access of the first remote device to the requested software function or the first software function.

8. The computer program product of claim 7, wherein deactivating the remote access of the first remote device to the requested software function or the first software function comprises:
maintaining the remote access to the software function which is not deactivated.

9. The computer program product of claim 7, wherein deactivating the remote access of the first remote device to the requested software function or the first software function comprises:
deactivating the remote access to the first software function while maintaining the remote access to the requested software function, or
deactivating the remote access to the requested software function while maintaining the remote access to the first software function.

10. The computer program product of claim 7, the operations further comprising:
after deactivating the remote access of the first remote device to the requested software function or the first software function, receiving an activation command for the respective function and, based on the activation command, activating the remote access of the first remote device to the respective function.

11. The computer program product of claim 7, wherein the first software function and the requested software function are embedded in a common programming code on the one or more servers, wherein the code includes code snippets associated with the first software function and code snippets associated with the requested software function, and wherein the code snippets are configured to activate or deactivate their respective software functions independently from each other.

12. The computer program product of claim 7, the operations further comprising:
accessing data that is locally stored on the first remote device, processing the local data and forwarding the processed data from the requested software function to the first software function.

13. The computer program product of claim 7, the operations further comprising:
providing the list of second software functions to a second remote device that are not accessible by the second remote device, wherein the second remote device has remote access to a third software function;
receiving from the second remote device a second request for the software function requested by the second remote device and upon receiving the second request, providing the second remote device, independently from the first remote device, remote access to the requested software function by transmitting second access data for the requested software function to the second remote device; and
after providing the second remote device the remote access to the requested software function, receiving from the second remote device a deactivation command for the requested software function or the third software function and, based on the deactivation command, deactivating, independently from the first remote device, the remote access of the second remote device to the requested software function or the third software function.

14. A system for providing a remote device remote access to software functions, the system comprising:
one or more computers; and
a computer-readable medium coupled to the one or more computers having instructions stored thereon which, when executed by the one or more computers, cause the one or more computers to perform operations, the operations comprising:

providing a list of second software functions to a first remote device that are not accessible by the first remote device, wherein the first remote device has remote access to a first software function, the first software function and the second software functions representing functionality hosted centrally in a cloud-computing environment, the first remote device including a tenant system providing a set of cloud-hosted applications associated with an entity corresponding to the tenant system, the second software functions including additional functionality for enhancing existing functionalities of the first software function, the first software function hosted in the cloud-computing environment and to which the first remote device currently has remote access, and the second software functions in the list represent functionalities dependent upon the first software function;

in response to providing the list of second software functions, receiving from the first remote device a request for a software function of the provided list of second software functions and upon receiving the request, providing the first remote device remote access to the requested software function by transmitting access data for the requested software function to the first remote device, wherein the access data allows the first remote device to remotely incorporate, in the cloud-computing environment, the additional functionality of the requested software function from the list of second software functions into the first software function, and remotely incorporating the additional functionality of the requested software function comprises providing remote access to an augmented version of the first software function, the augmented version of the first software function comprising the first software function augmented by incorporating the dependent functionality of the requested software function with operations of the first software function; and after providing the remote access to the requested software function, receiving from the first remote device a deactivation command for the requested software function or the first software function and, based on the deactivation command, deactivating the remote access of the first remote device to the requested software function or the first software function.

15. The computer program product of claim 14, wherein deactivating the remote access of the first remote device to the requested software function or the first software function comprises:
maintaining the remote access to the software function which is not deactivated.

16. The computer program product of claim 14, wherein deactivating the remote access of the first remote device to the requested software function or the first software function comprises:
deactivating the remote access to the first software function while maintaining the remote access to the requested software function, or
deactivating the remote access to the requested software function while maintaining the remote access to the first software function.

17. The system of claim 14, the operations further comprising:
after deactivating the remote access of the first remote device to the requested software function or the first software function, receiving an activation command for the respective function and, based on the activation command, activating the remote access of the first remote device to the respective function.

18. The system of claim 14, wherein the first software function and the requested software function are embedded in a common programming code on the one or more computers, wherein the code includes code snippets associated with the first software function and code snippets associated with the requested software function, and wherein the code snippets are configured to activate or deactivate their respective software functions independently from each other.

19. The system of claim 14, wherein the one or more computers and the first remote device are part of the cloud-computing environment.

20. The system of claim 14, the operations further comprising:
providing the list of second software functions to a second remote device that are not accessible by the second remote device, wherein the second remote device has remote access to a third software function;
receiving from the second remote device a second request for the software function requested by the second remote device and upon receiving the second request, providing the second remote device, independently from the first remote device, remote access to the requested software function by transmitting second access data for the requested software function to the second remote device; and
after providing the second remote device the remote access to the requested software function, receiving from the second remote device a deactivation command for the requested software function or the third software function and, based on the deactivation command, deactivating, independently from the first remote device, the remote access of the second remote device to the requested software function or the third software function.

21. A cloud computing system for providing a remote device remote access to software functions, comprising:
one or more servers; and
a computer-readable medium coupled to the one or more computers having instructions stored thereon which, when executed by the one or more computers, cause the one or more servers to perform operations, the operations comprising:
providing a list of second software functions to the remote device that are not accessible by the remote device, wherein the remote device has remote access to a first software function, the first software function and the second software functions representing functionality hosted centrally in the cloud computing system, the first remote device including a tenant system providing a set of cloud-hosted applications associated with an entity corresponding to the tenant system, the second software functions including additional functionality for enhancing existing functionalities of the first software function, the first software function hosted in the cloud computing system and to which the first remote device currently has remote access, and the second software functions in the list represent functionalities dependent upon the first software function;

in response to providing the list of second software functions, receiving from the remote device a request for a software function of the provided list of second software functions and upon receiving the request, providing the remote device remote access to the requested software function by transmitting access data for the requested software function to the remote device, wherein the access data allows the first remote device to remotely incorporate, in the cloud computing system, the additional functionality of the requested software function from the list of second software functions into the first software function, and remotely incorporating the additional functionality of the requested software function comprises providing remote access to an augmented version of the first software function, the augmented version of the first software function comprising the first software function augmented by incorporating the dependent functionality of the requested software function with operations of the first software function;

after providing the remote access to the requested software function, receiving from the remote device a deactivation command for the requested software function or the first software function and, based on the deactivation command, deactivating the remote access of the remote device to the requested software function or the first software function; and after deactivating the remote access of the remote device to the requested software function or the first software function, receiving from the remote device an activation command for the respective function and, based on the activation command, activating the remote access of the remote device to the respective function.

\* \* \* \* \*